(12) United States Patent
Baptist et al.

(10) Patent No.: US 10,157,021 B2
(45) Date of Patent: Dec. 18, 2018

(54) PROCESSING INCOMPLETE DATA ACCESS TRANSACTIONS

(71) Applicant: International Business Machines Corporation, Armonk, NY (US)

(72) Inventors: Andrew D. Baptist, Mt. Pleasant, WI (US); Greg R. Dhuse, Chicago, IL (US); Ravi V. Khadiwala, Bartlett, IL (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 15/196,442

(22) Filed: Jun. 29, 2016

(65) Prior Publication Data

US 2018/0004453 A1 Jan. 4, 2018

(51) Int. Cl.
*G06F 12/00* (2006.01)
*G06F 13/00* (2006.01)
(Continued)

(52) U.S. Cl.
CPC .......... *G06F 3/0659* (2013.01); *G06F 3/061* (2013.01); *G06F 3/067* (2013.01); *G06F 3/0619* (2013.01); *G06F 11/1076* (2013.01)

(58) Field of Classification Search
CPC .......... G06F 3/00; G06F 3/06–3/0604; G06F 3/0605–3/0611; G06F 3/0613–3/0619;
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Transactional Memory: Architectural Support for Lock-free Data Structures; Herlihy et al; Proceedings of the 20th Annual International Symposium on Computer Architecture; May 16-19, 1993; pp. 289-300 (12 pages) (Year: 1993).*

(Continued)

*Primary Examiner* — Daniel C Chappell
(74) *Attorney, Agent, or Firm* — Garlick & Markison; Timothy W. Markison

(57) ABSTRACT

A method includes obtaining a set of pending transaction information from a set of storage units regarding a plurality of pending transactions. A pending transaction information includes information regarding an encoded data slice and a computing device issuing a data access request. The method further includes identifying an incomplete transaction based on the set of pending transaction information. The method further includes determining whether to complete the incomplete transaction based on information regarding the requesting computing device. The method further includes, when the incomplete transaction is not to be completed, instructing the storage units to discard a corresponding data access request associated with the incomplete transaction. The method further includes, when the incomplete transaction is to be completed, determining what aspects of the corresponding data access request have not been completed and instructing at least one storage unit to complete the aspects of the corresponding data access request.

20 Claims, 10 Drawing Sheets

(51) Int. Cl.
  *G06F 13/28* (2006.01)
  *G06F 3/06* (2006.01)
  *G06F 11/10* (2006.01)

(58) Field of Classification Search
  CPC ..... G06F 3/062–3/0659; G06F 3/0661–3/067; G06F 3/0671–3/0689; G06F 5/00–5/16; G06F 11/0703–11/0751; G06F 11/0754–11/0796; G06F 11/08–11/1076; G06F 11/108–11/1474; G06F 11/30–11/3495; G06F 17/30–17/30997; G06F 2003/0691–2003/0698; G06F 2212/00–2212/7211
  See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,647,514 B1* | 11/2003 | Umberger | G06F 11/1092 714/42 |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,910,100 B2* | 6/2005 | Lewalski-Brechter | G06F 3/0619 711/114 |
| 6,957,253 B1* | 10/2005 | Mather | G06F 17/30607 709/220 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,334,096 B1* | 2/2008 | Burriss | G06F 3/0605 711/161 |
| 7,415,591 B1* | 8/2008 | Todd | G06F 3/0614 711/165 |
| 7,636,724 B2 | 12/2009 | de la Torre et al. | |
| 8,180,927 B2* | 5/2012 | Hallamaa | G06Q 50/32 710/5 |
| 8,601,222 B2* | 12/2013 | Flynn | G06F 11/1048 711/152 |
| 9,075,773 B1* | 7/2015 | Rakitzis | G06F 11/2094 |
| 9,158,573 B2* | 10/2015 | Busaba | G06F 3/067 |
| 9,250,809 B2* | 2/2016 | Yamamoto | G06F 3/0604 |
| 9,280,416 B1* | 3/2016 | Xin | H03M 13/373 |
| 9,348,522 B2* | 5/2016 | Busaba | G06F 9/467 |
| 9,348,523 B2* | 5/2016 | Busaba | G06F 9/467 |
| 9,547,553 B1* | 1/2017 | Khermosh | G06F 11/1064 |
| 9,696,928 B2* | 7/2017 | Cain, III | G06F 3/0622 |
| 9,697,267 B2* | 7/2017 | Kadayam | G06F 11/1448 |
| 9,734,007 B2* | 8/2017 | Luby | G06F 11/1008 |
| 9,910,697 B2* | 3/2018 | DeArment | G06F 3/0619 |
| 10,019,320 B2* | 7/2018 | Talagala | G06F 11/1441 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0225453 A1* | 9/2011 | Spry | G06F 11/1092 714/15 |
| 2012/0331088 A1* | 12/2012 | O'Hare | G06F 21/6227 709/214 |
| 2013/0151581 A1* | 6/2013 | Leggette | H04L 67/10 709/201 |
| 2013/0238900 A1* | 9/2013 | Leggette | H04L 63/0428 713/165 |
| 2014/0215147 A1* | 7/2014 | Pan | G06F 11/1092 711/114 |
| 2014/0351457 A1* | 11/2014 | Baptist | G06F 3/0659 710/5 |
| 2015/0095308 A1* | 4/2015 | Kornacker | G06F 17/30448 707/718 |
| 2015/0242272 A1* | 8/2015 | Resch | G06F 17/30864 714/764 |
| 2015/0358037 A1* | 12/2015 | Li | G06F 11/1088 714/763 |
| 2016/0011935 A1* | 1/2016 | Luby | G06F 3/0617 714/6.2 |
| 2016/0011939 A1* | 1/2016 | Luby | G06F 11/1076 714/764 |
| 2016/0179621 A1* | 6/2016 | Schirripa | G06F 11/1469 714/6.24 |
| 2016/0335158 A1* | 11/2016 | De Schrijver | G06F 11/1076 |
| 2017/0242739 A1* | 8/2017 | De Schrijver | G06F 11/076 |

OTHER PUBLICATIONS

Packet-dispersion techniques and a capacity-estimation methodology; Dovrolis et al.; IEEE/ACM Transactions on Networking, vol. 12, iss. 6, Dec. 2004; pp. 963-977 (Year: 2004).* Data Storage

(56) References Cited

OTHER PUBLICATIONS

Management in Cloud Environments: Taxonomy, Survey, and Future Directions; Mansouri et al.; ACM Computing Surveys, vol. 50, iss. 6; Article No. 91; Jan. 2018 (Year: 2018).*

Data protection by means of fragmentation in distributed storage systems; Kapusta et al.; 2015 International Conference on Protocol Engineering (ICPE) and International Conference on New Technologies of Distributed Systems; Jul. 22-24, 2015 (Year: 2015).*

JigDFS: A secure distributed file system; Bian et al.; IEEE Symposium on Computational Intelligence in Cyber Security; Mar. 30, 2009-Apr. 4, 2009 (Year: 2009).*

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

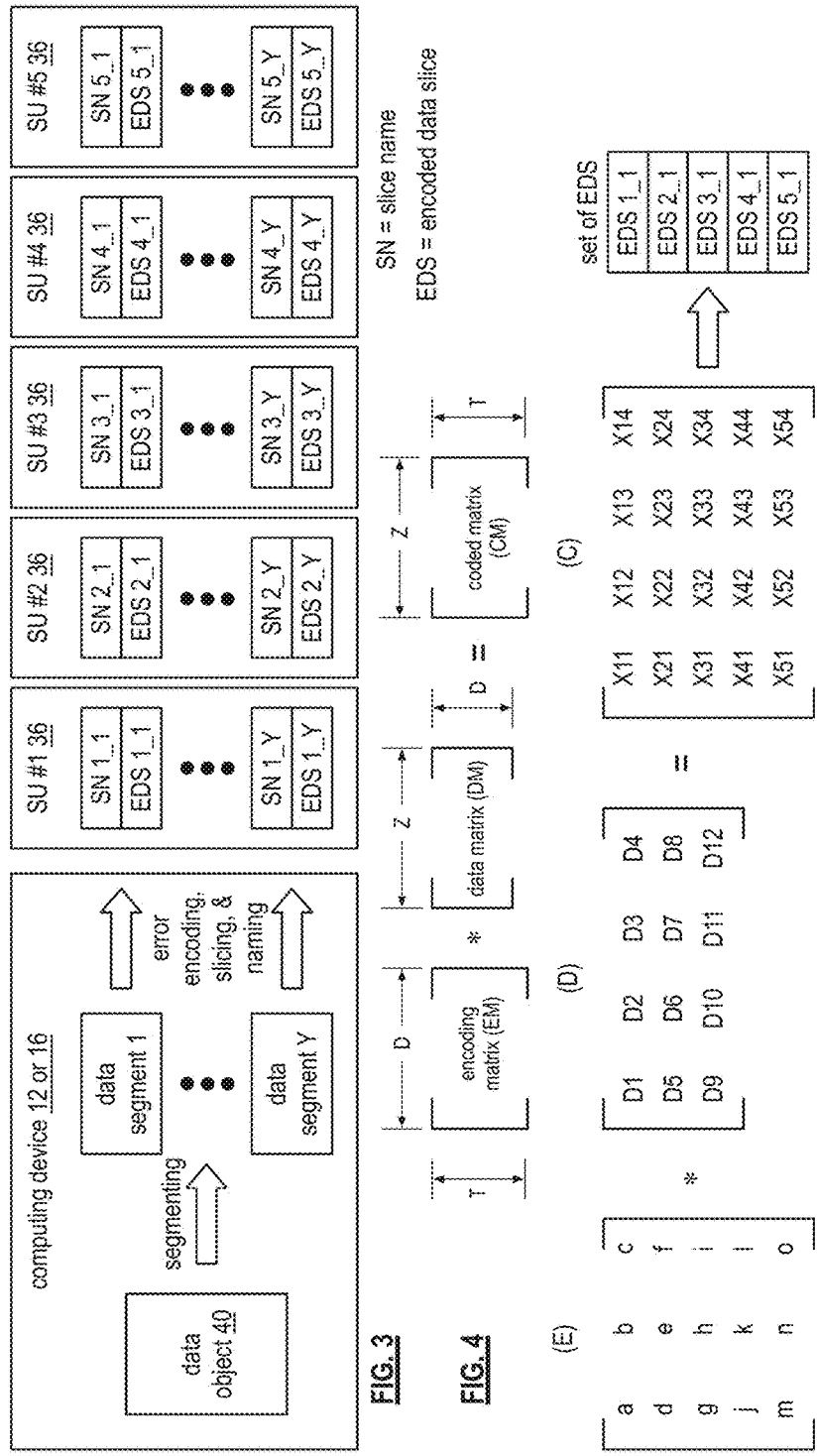

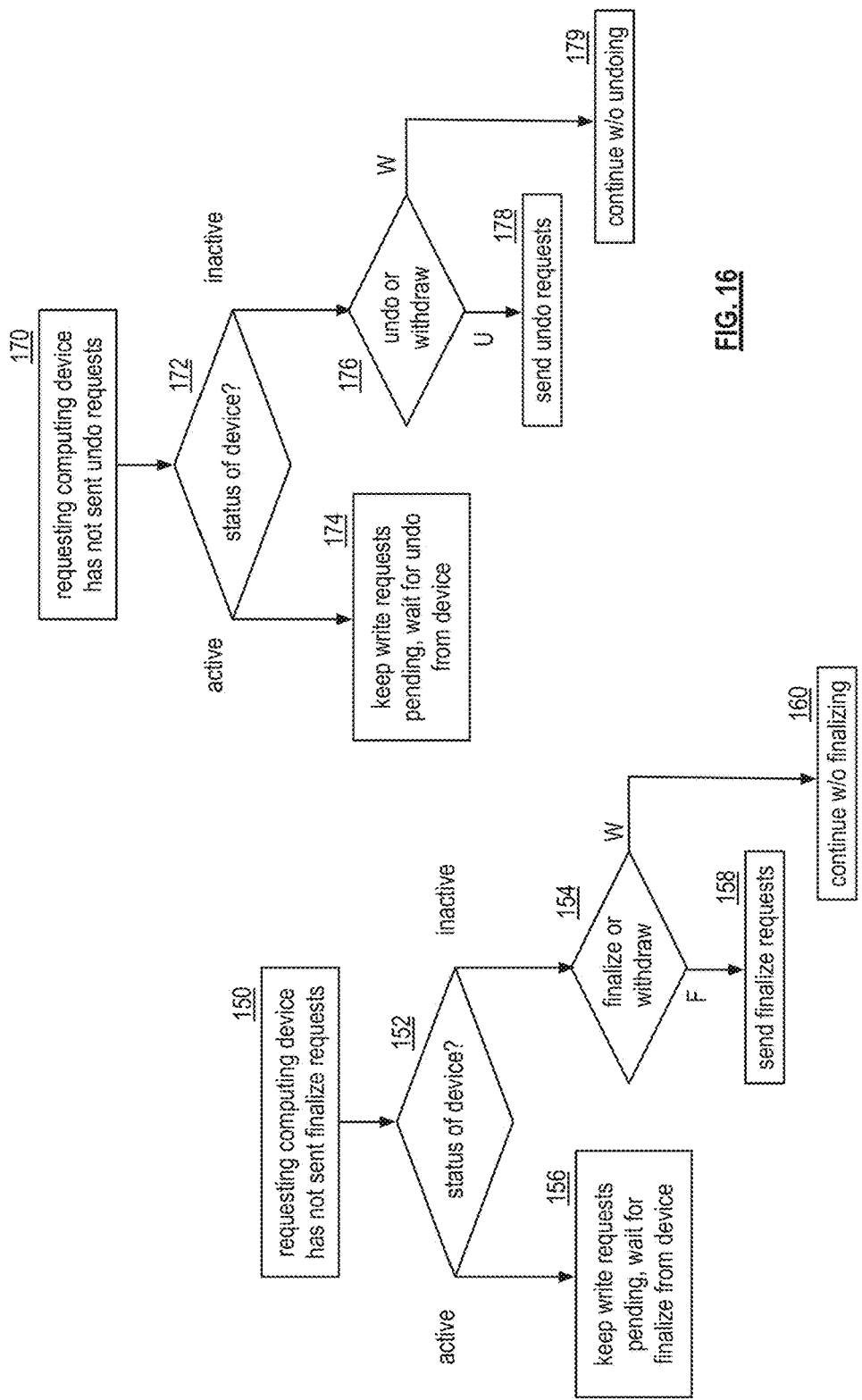

PROCESSING INCOMPLETE DATA ACCESS TRANSACTIONS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems are known to utilize a three-phase process for writing consistently in a dispersed storage network (DSN) memory, where the three phases include: (1) A write phase; (2) A commit phase; and (3) A finalize phase. The three phases address consistency issues that may arise from different storage units of the DSN holding different revisions of encoded data slices, where data is dispersed storage error encoded to produce the encoded data slices. The three phases are known to utilize a threshold approach to advance the writing process to the next phase or to reverse the process when conflicts and errors arise to maintain consistency of revision storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 15 is a logic diagram of another example of a method for processing incomplete transactions in accordance with the present invention;

FIG. 16 is a logic diagram of another example of a method for processing incomplete transactions in accordance with the present invention.

DETAILED DESCRIPTION OF THE INVENTION

Figure 1:
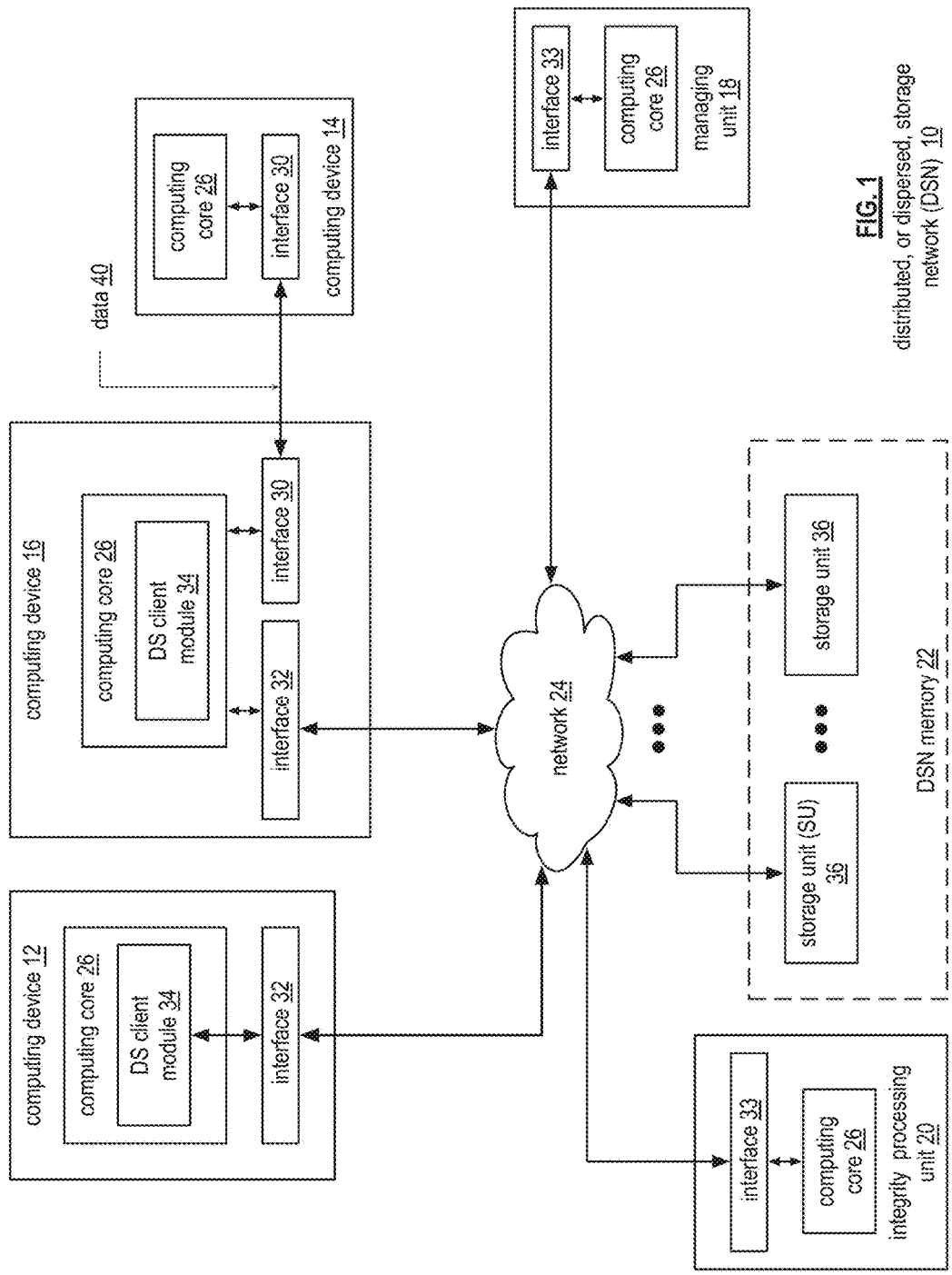
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
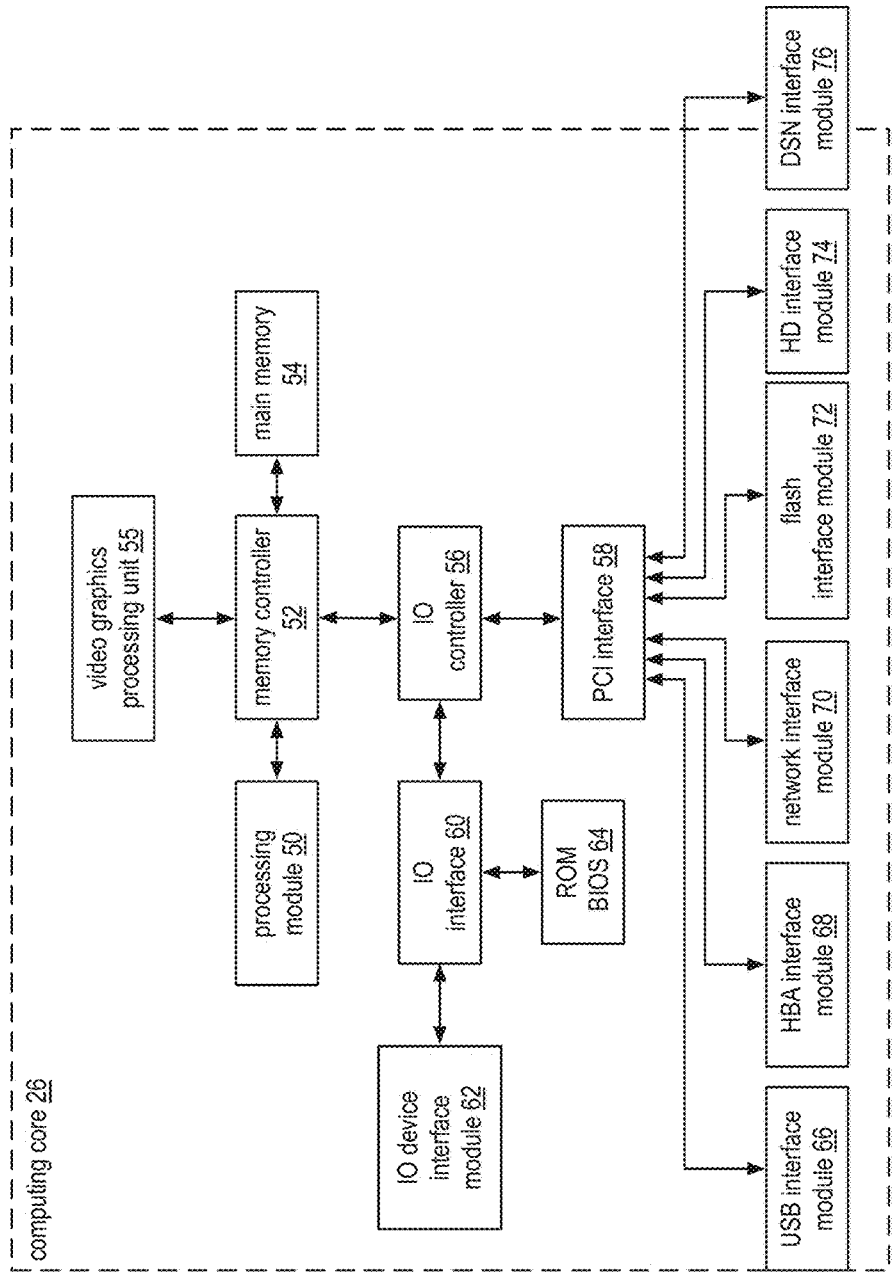
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
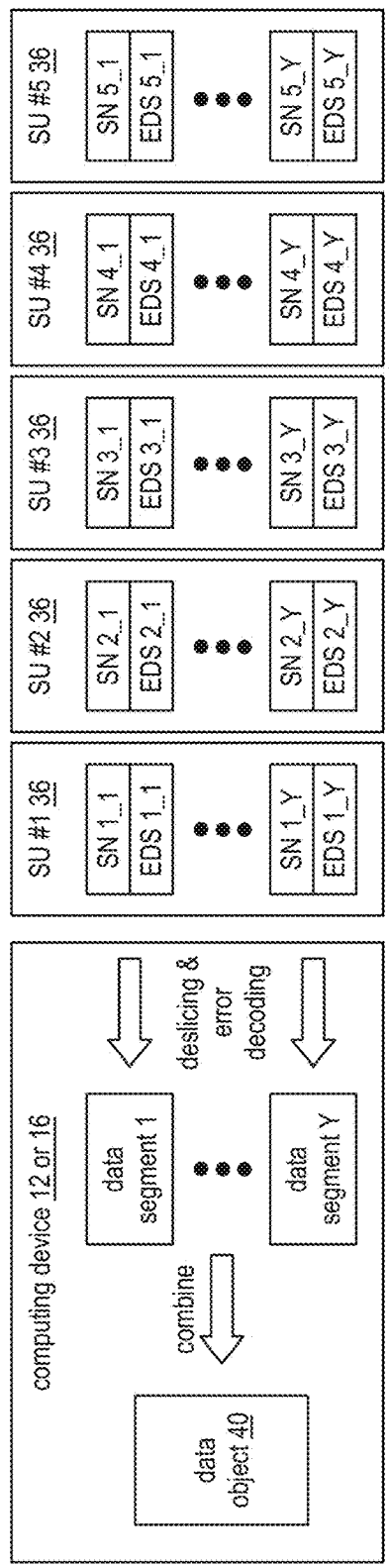
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
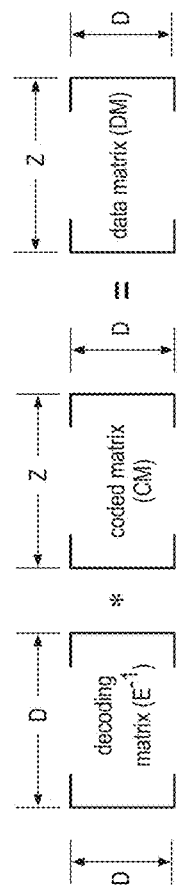
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
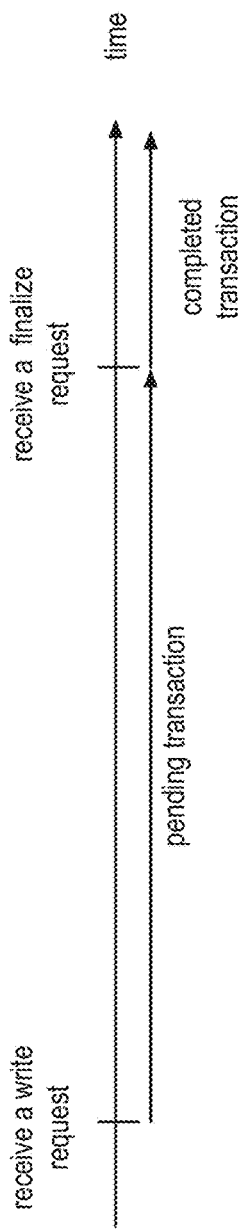
FIG. 9 is a diagram of an example of a write operation from a storage unit's perspective in accordance with the present invention.

FIG. 9 is a diagram of an example of a write operation from a storage unit's perspective. For a write operation regarding a set of encoded data slices, a requesting computing device sends a set of write requests to the storage units. For example, a first write request of the set goes to a first storage unit, a second write request goes to a second storage unit, and so on. For an individual storage unit, it receives a write request, which opens up a transaction for the write operation with respect to the individual storage unit. This information is added to the storage unit's transaction information, which will be discussed with reference to one or more subsequent figures.

The write operation transaction remains open (or incomplete) until the storage unit receives a finalize request. At the point, the transaction is completed and, for this storage unit, the encoded data slice has been successfully stored. Alternatively, while a transaction is pending, the storage unit may receive an undo request. The undo request indicates the requesting device's desire to terminate the write operation prior to completion.

Figure 10:
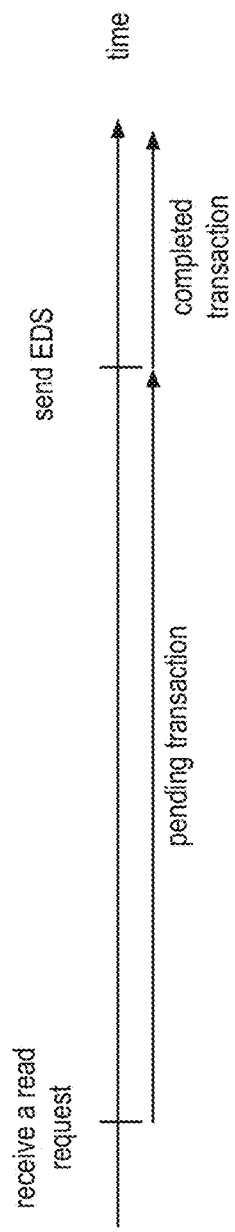
FIG. 10 is a diagram of an example of a read operation from a storage unit's perspective in accordance with the present invention.

FIG. 10 is a diagram of an example of a read operation from a storage unit's perspective. For a read operation regarding a set of encoded data slices, a requesting computing device sends a set of read requests to the storage units. For example, a first read request of the set goes to a first storage unit, a second read request goes to a second storage unit, and so on. For an individual storage unit, it receives a read request, which opens up a transaction for the read operation with respect to the individual storage unit. This information is added to the storage unit's transaction information. The read operation transaction remains open (or incomplete) until the storage unit sends the requested encoded data slice to the requesting computing device.

Figure 11:
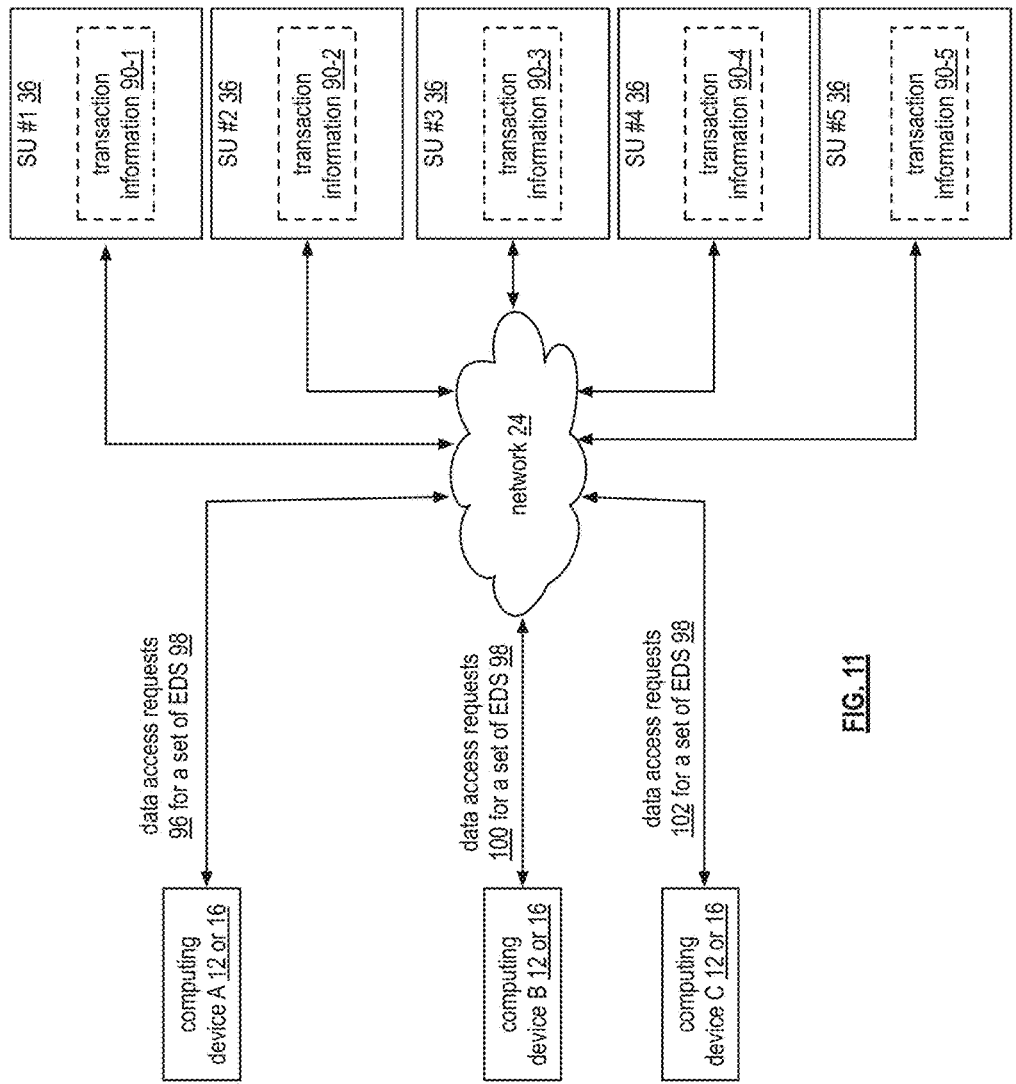
FIG. 11 is a schematic block diagram of an example of data access requests for a set of encoded data slices in accordance with the present invention.

FIG. 11 is a schematic block diagram of an example of multiple overlapping data access requests for a set of encoded data slices. In this example, each of computing devices A, B, and C are issuing data access requests 96, 100, and 102 for the same set of encoded data slices 98. The data access requests may be read requests or write requests and include the same set of slices names, which identifies the set of encoded data slices.

Each of the storage units (SU #1-SU #5 in this example), builds its respective transaction information 90 (e.g., 90-1 through 90-5) based on the order in which it receives the overlapping data access requests (e.g., one received before another is completed). In general, the transaction information 90 is used to determine which computing device's data access request will be processed by the set of storage units 36. The transaction information is further used to determine what processing, if any, should be done for incomplete transactions (e.g., ones in which the requesting computing device has gone off-line, the requesting computing device has failed, the requesting computing device did not win the processing determination, a storage unit has gone off-line, a storage unit did not receive a finalize command, etc.).

Figure 12:
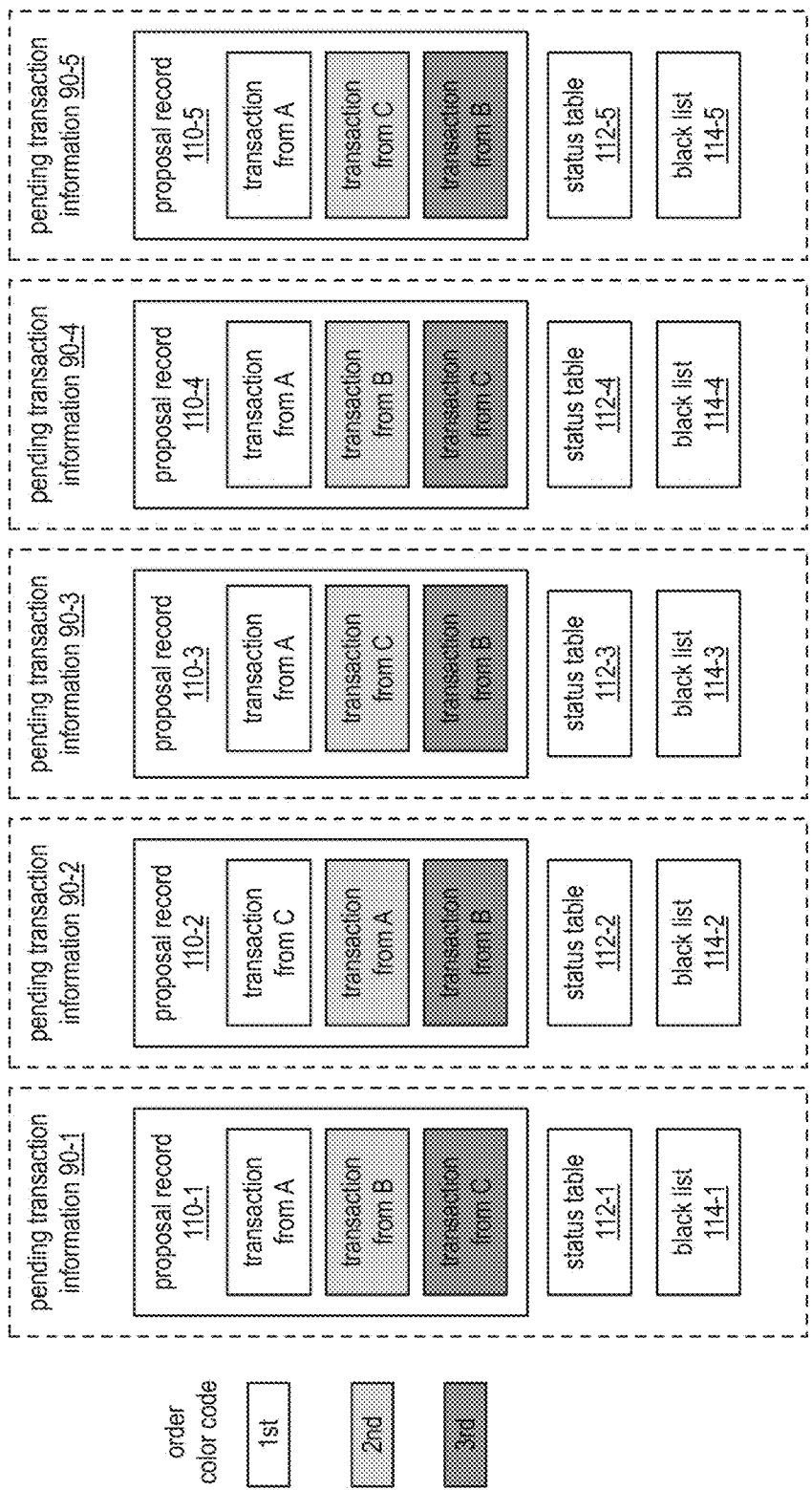
FIG. 12 is a schematic block diagram of an example of pending transaction information for overlapping data access requests for a set of encoded data slices in accordance with the present invention.

FIG. 12 is a schematic block diagram of an example of pending transaction information 90 for the overlapping data access requests 96, 100, and 102 for the set of encoded data slices 98 of FIG. 11. The pending transaction information 90 includes a proposal record 110, a status table 112, and a black list 114. The proposal record 110 includes, for the encoded data slice in this example (or for a batch of encoded data slices), an ordered list of pending transactions regarding the encoded data slice (or the batch of encoded data slices). The ordered list is prioritized based a first received basis.

In the example, the ordered list for storage unit 1 has the transaction from computing device A in a first priority position, the transaction from computing device B in a second priority position, and the transaction from computing device C in a third priority position. As such, storage unit 1 receives the data access request from computing device A first, then the one from computing device B, and then the one from computing device C. Storage unit 4 has the same proposal record.

Storage unit 2 received the data access request from computing device C first, then the one from computing device A, and then the one from computing device B. As such, the proposal record 110-2 for storage unit 2 has the transaction of computing device C in the first priority position, the transaction of computing device A in the second priority position, and the transaction of computing device B in the third priority position.

Storage units 3 and 5 each received the data access request from computing device A first, then the one from computing device C, and then the one from computing device B. As such, the proposal records 110-3 and 100-5 for storage units 3 and 5 has the transaction of computing device A in the first priority position, the transaction of computing device C in the second priority position, and the transaction of computing device B in the third priority position.

The proposal records 110 each further include an indication of current revision level for the encoded data slice or the batch of encoded data slices (not shown). For example, if the current revision level is 3 for a set of encoded data slices, then each storage unit will include an indication of revision level 3 in its proposal record. The proposal records further include an ordered list of different version of the encoded data slice or the batch of encoded data slices for the pending transactions when the data access request is a write request. For example, if the data access requests from computing devices A and B are write requests, then the ordered list of different versions for all five storage units would have the encoded data slice from computing device A in the first priority position and the one from computing device B in the second priority position.

The pending transaction information 90 of each of the storage units also includes a status table 112. The status table 112 includes information regarding status of data access requesting computing devices having one or more pending transactions. For example, the status table includes for a computing device its connection status (e.g., on-line, off-line, corrupted, failed, etc.), a ping/heart beat response, its time since last request, its input and output data rate requirements and/or capabilities, and/or any other information that assists in determining the status of a computing device.

The pending transaction 90 of each storage unit further includes a blacklist of known inactive computing devices. An inactive computing device is one that is slow, has failed, has crashed, has stalled, is disconnected, and/or otherwise malfunctioning and, as such, is unable to complete a transaction.

In this example, each of storage units 1 and 3-5 have the transaction from computing device A in the first priority position. In this example, having four of the five first priority positions are sufficient to establish computing device A's transaction as the winning transaction (i.e., the one that will be processed by the storage units). If the data access request for each of computing devices A, B, and C are write requests, the three computing devices all know that computing device A is the winner. In this instance, computing devices B and C may issue an undo request to the storage units to delete their pending data access request (i.e., their pending transactions). If the data access request for computing device A is completed and the other two computing devices each issue undo requests, then the transaction information 90 for this set of encoded data slices is deleted by the set of storage units and the transactions are then deemed completed. There are, however, many potential instances where one or more of the transactions remain incomplete.

Figure 13:
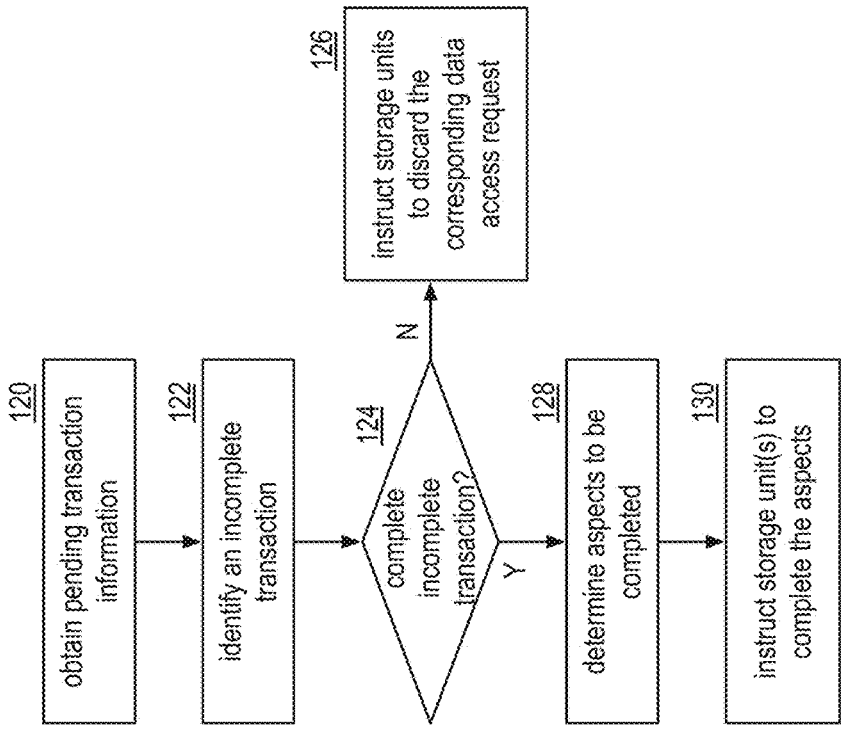
FIG. 13 is a logic diagram of an example of a method for processing incomplete transactions in accordance with the present invention.

FIG. 13 is a logic diagram of an example of a method for processing incomplete transactions. The method begins at step 120 where a device (e.g., a computing device 12-16, a managing unit 18, an integrity processing unit 20, and/or a storage unit 36), obtains (e.g., receives, requests, looks up, etc.) a set of pending transaction information from a set of storage units. The set of pending transaction information is regarding pending transactions for overlapping data access requests to the same set of encoded data slices. An example of pending transaction information was discussed with reference to FIG. 12.

The method continues at step 122 where the device identifies an incomplete transaction based on the set of pending transaction information. An incomplete transaction is a transaction that has not yet been completed for a variety of reasons. For example, a transaction is incomplete when a winning computing device has not yet issued a set of finalize requests. As another example, a transaction is incomplete when a winning computing device has issued a set of finalize requests and one or more storage units did not receive it or received a corrupted finalize request. As another example, a transaction is incomplete when a non-winning computing device has not yet issued a set of undo requests. As yet another example, a transaction is not complete when a winning computing device has not yet been established.

The method continues at step 124 where the device determines whether to complete the incomplete transaction based on information regarding a requesting computing device associated with the incomplete transaction. Various examples will be discussed in subsequent Figures. When the incomplete transaction is not to be completed, the method continues at step 126 where the device instructs the storage units to discard (e.g., flag as bad, ignore, undo aspects, and/or delete) a corresponding data access request associated with the incomplete transaction.

When the incomplete transaction is to be completed, the method continues at step 128 where the device determines what aspects of the corresponding data access request have not been completed. For example, the device determines that set of finalize requests have not yet been issued. As another example, the device determines that one or more storage units did not receive its finalize request. As yet another example, the device determines a non-winning computing device did not issue a set of undo requests. As yet a further example, the device determines that a winning computing device has not yet been determined. The method continues at step 130 where the device instructs at least one of the storage units to complete the aspects of the corresponding data access request. After completion of the incomplete transaction, the device may send a set of clean up requests to the set of storage units to fully or partially delete the pending transaction information for the encoded data slices.

Figure 14:
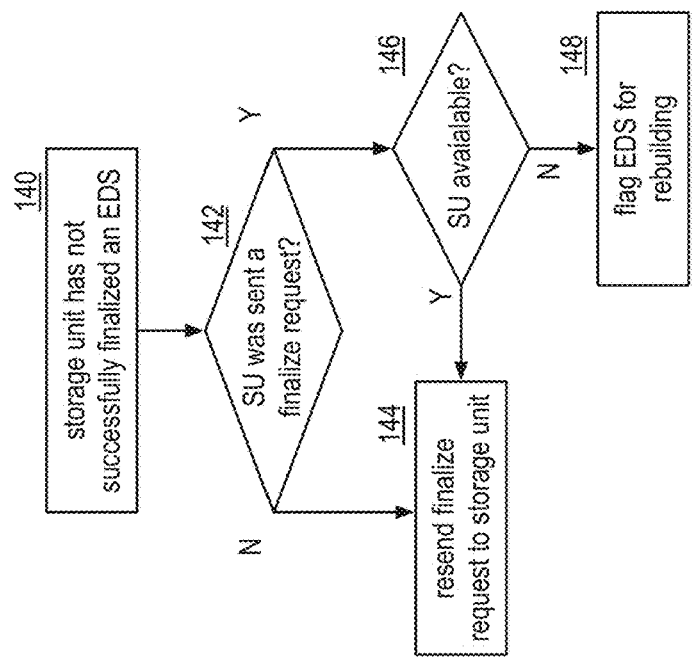
FIG. 14 is a logic diagram of another example of a method for processing incomplete transactions in accordance with the present invention.

FIG. 14 is a logic diagram of another example of a method for processing incomplete transactions when, for a winning computing device, a storage unit has not successfully processed a finalize request. The method begins at step 140 where the device determines that a storage unit has not successfully finalized a write request for the encoded data slice of the winning computing device. As such, the aspect of the incomplete transaction is the non-successfully finalizing of the encoded data slices (e.g., complete storage of the encoded data slice by making it the now current version of the encoded data slice for its slice name).

The method continues at step 142 where the device determines whether the storage units was sent a finalize request. For example, the finalize request may have been sent but not received by the storage unit for a variety of reasons (e.g., corrupted data, lost data, storage unit was temporarily off-line, etc.). If the finalize request was not sent to this storage unit but did send it to other storage units, the method continues at step 144 where the device resends the finalize request to the storage unit.

If the finalize request was sent to this storage unit, the method continues at step 146 where the device determines whether the storage unit is now currently available. If yes, the device resends the finalize request as per step 144. If the storage unit is not currently available, the method continues at step 148 where the device flags the encoded data slice for rebuilding. Step 148 may further include indicating that the incomplete transaction is not be completed by the particular storage unit when the particular encoded data slice is flagged for rebuilding.

FIG. 15 is a logic diagram of another example of a method for processing incomplete transactions when the winning computing device did not send a set of finalize requests. The method begins at step 150 where the device determines that the winning requesting computing device did not the set of finalize commands. For example, the computing device may be off-line, may have failed, may be in a suspended mode, etc.

The method continues at step 152 where the device determines the status of the requesting computing device based on the pending transaction information (e.g., based on the status table). When a majority of the pending transaction information indicates that the requesting computing device has a status of active, the method continues at step 156 where the device keeps the write requests pending and waits for the winning computing device to issue the finalize commands.

When a majority of the pending transaction information indicates that the requesting computing device has a status of inactive, the method continues at step 154 where the device determines whether to send the set of finalize requests for the winning computing device. For example, the winning computing device is inactive because it is currently overloaded and unable to issue the set of finalize requests in a timely manner. As another example, the winning computing device is inactive because it is temporarily off-line. In addition to the status of the computing device, the determination includes what is best for the DSN. For example, it may be in the best interest of the DSN to finalize the write operation now or wait until the winning computing device is in a position to issue the finalize requests.

When the set of finalize requests are to be sent on behalf of the requesting computing device, the method continues at step 158 where the device sends the set of finalize requests to the set of storage units. When the set of finalize requests are not to be sent on behalf of the requesting computing device, the method continues at step 160 where the device sends an indication to the set of storage units to keep continue without finalizing and may further indicate to withdraw the write transaction of the winning computing device.

FIG. 16 is a logic diagram of another example of a method for processing incomplete transactions when a non-winning computing device has not yet issued undo requests. The method begins at step 170 where the device determines that a non-winning requesting computing device has not yet issued a set of undo requests. The method continues at step 172 where the device determines the status of the computing device.

When a majority of the pending transaction information indicates that the requesting computing device has a status of inactive, the method continues at step 176 where the device indicates that the incomplete transaction is not to be completed and sending a set of undo requests to the set of storage units. When a majority of the pending transaction information indicates that the requesting computing device has a status of active, the method continues at step 174 where the device keeps the write requests pending and waits for the non-winning computing device to issue the undo commands.

When a majority of the pending transaction information indicates that the non-winning computing device has a status of inactive, the method continues at step 176 where the device determines whether to send the undo requests or to withdraw the transaction. When the device determines to send the undo requests, the method continues at step 178 where the device sends the undo requests. When the device determines to withdraw the transaction, the method continues at step 180 where the device continues without undoing and may further indicate to withdraw the write transaction of the non-winning computing device.

Figure 17:
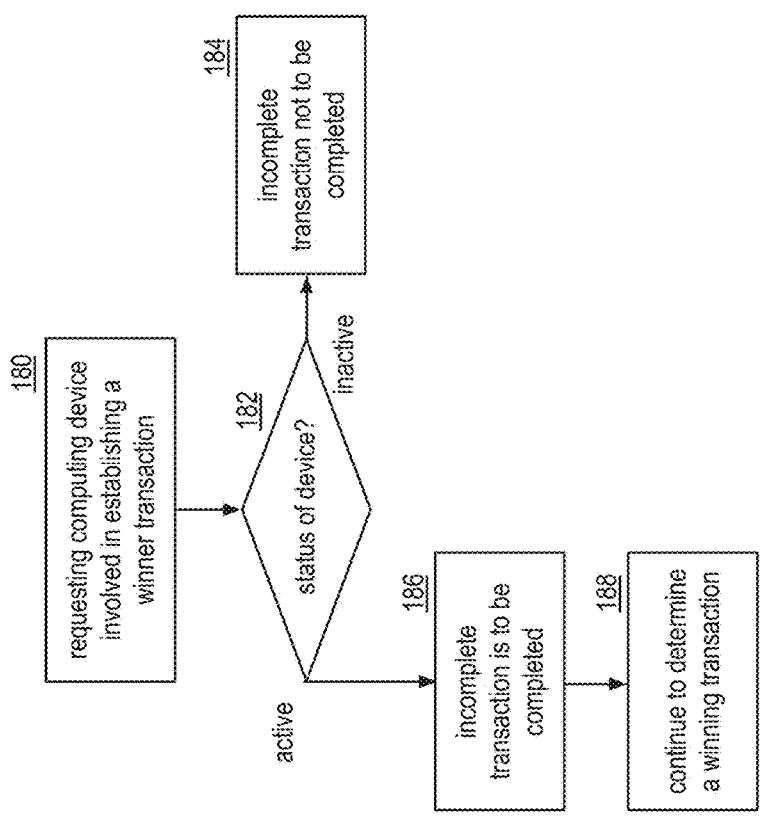
FIG. 17 is a logic diagram of another example of a method for processing incomplete transactions in accordance with the present invention.

FIG. 17 is a logic diagram of another example of a method for processing incomplete transactions when a winning computing device has not yet been established. The method begins at step 180 where the devices identifies the computing device as being involved in establishing a winning transaction. The method continues at step 182 where the device determining status of the requesting computing device based on the pending transaction information.

When a majority of the pending transaction information indicates that the requesting computing device has a status of inactive, the method continues at step 184 where the device indicates that the incomplete transaction is not to be completed and sends a set of undo requests to the set of storage units. When the majority of the pending transaction information indicates that the requesting computing device has the status of active, the method continues at step 186 where the device indicates that the incomplete transaction is to be completed (e.g., a winning computing device is to be established). The method continues at step 188 where the device instructs the set of storage units to continue with the processing of establishing the winning set.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:
    obtaining a set of pending transaction information from a set of storage units of the DSN regarding a plurality of pending transactions, wherein a pending transaction of the plurality of pending transactions is regarding a data access request to a set of encoded data slices and wherein the pending transaction information from a storage unit of the set of storage units is regarding one or more pending data access requests for an encoded data slice of the set of encoded data slices, wherein a data segment of a data object is dispersed storage error encoded to produce the set of encoded data slices, and wherein the set of encoded data slices are stored in the set of storage units;
    identifying an incomplete transaction based on the set of pending transaction information, wherein the incomplete transaction is a stalled pending transaction of the plurality of pending transactions;
    determining whether to complete the incomplete transaction based on information regarding a requesting computing device associated with the incomplete transaction;
    when the incomplete transaction is not to be completed, instructing the storage units to discard a corresponding data access request associated with the incomplete transaction; and
    when the incomplete transaction is to be completed:
        determining what aspects of the corresponding data access request have not been completed; and
        instructing at least one of the storage units to complete the aspects of the corresponding data access request.

2. The method of claim 1, wherein the pending transaction information comprises one or more of:

one or more proposal records, wherein a proposal record of the one or more proposal records includes, for an encoded data slice or a batch of encoded data slices:
   an ordered list of pending transactions regarding the encoded data slice or the batch of encoded data slices;
   an indication of current revision level for the encoded data slice or the batch of encoded data slices; and
   an ordered list of different version of the encoded data slice or the batch of encoded data slices;
a status table that includes information regarding status of data access requesting computing devices having one or more pending transactions; and
a blacklist that includes identity of inactive computing devices, wherein an inactive computing device of the inactive computing devices is affiliated with a transaction that cannot be completed due to a persistent inactive status of the inactive computing device.

3. The method of claim 1 further comprises:
identifying the incomplete transaction is a write operation regarding the set of encoded data slices from the requesting computing device, wherein a write threshold number of encoded data slices of the set of encoded data slices have been successfully stored in at least some of the storage units of the set of storage unit, wherein a particular encoded data slice of the set of encoded data slices was not successfully finalized by a particular storage unit of the set of storage units, and wherein the unsuccessful finalizing of the particular encoded data slice corresponds to the aspects of the corresponding data access request that have not been completed;
determining whether the particular storage unit was sent a finalize request regarding the particular encoded data slice by the requesting computing device;
when the particular storage unit was not sent the finalize request, resending the finalize request to the particular storage unit to complete the write operation;
when the particular storage unit was sent the finalize request:
   determining whether the particular storage unit is currently available to receive the finalize request;
   when the particular storage unit is available to receive the finalize request, resending the finalize request to the particular storage unit to complete the write operation; and
   when the particular storage unit is not available to receive the finalize request, flagging the particular encoded data slice for rebuilding.

4. The method of claim 3 further comprises:
indicating that the incomplete transaction is not to be completed by the particular storage unit when the particular encoded data slice is flagged for rebuilding.

5. The method of claim 1 further comprises:
identifying the incomplete transaction is a write operation regarding the set of encoded data slices from the requesting computing device, wherein the requesting computing device has a threshold number of write requests of a set of write requests regarding the set of encoded data slices in a first priority position in a set of proposal records of the pending transaction information from the set of storage units, wherein the requesting computing device has not issued a set of finalize requests to the set of storage units regarding the set of encoded data slices, and wherein the not issuing the set of finalize requests corresponds to the aspects of the corresponding data access request that have not been completed;
determining status of the requesting computing device based on the pending transaction information; and
when a majority of the pending transaction information indicates that the requesting computing device has a status of inactive, indicating that the incomplete transaction is not to be completed.

6. The method of claim 5 further comprises:
when a majority of the pending transaction information indicates that the requesting computing device has a status of active, determining whether to issue the set of finalize requests on behalf of the requesting computing device; and
when the set of finalize requests are to be sent on behalf of the requesting computing device, sending the set of finalize requests to the set of storage units.

7. The method of claim 6 further comprises:
when the set of finalize requests are not to be sent on behalf of the requesting computing device, sending an indication to the set of storage units to keep the set of write requests pending.

8. The method of claim 1 further comprises:
identifying the incomplete transaction is a write operation regarding the set of encoded data slices from the requesting computing device, wherein the requesting computing device does not have a threshold number of write requests of a set of write requests regarding the set of encoded data slices in a first priority position in a set of proposal records of the pending transaction information from the set of storage units, wherein the requesting computing device has not issued a set of undo requests to the set of storage units regarding the set of encoded data slices, and wherein the not issuing the set of undo requests and the set of write requests that are pending correspond to the aspects of the corresponding data access request that have not been completed;
determining status of the requesting computing device based on the pending transaction information; and
when a majority of the pending transaction information indicates that the requesting computing device has a status of inactive, indicating that the incomplete transaction is not to be completed and sending a set of undo requests to the set of storage units.

9. The method of claim 1 further comprises:
identifying the incomplete transaction as a write operation regarding the set of encoded data slices from the requesting computing device, wherein the requesting computing device is involved in a process of establishing one set of a plurality of sets of write requests as a winning set of write requests having a threshold number of write requests in a first priority position and wherein the process of establishing the winning set corresponds to the aspects of the corresponding data access request that have not been completed;
determining status of the requesting computing device based on the pending transaction information;
when a majority of the pending transaction information indicates that the requesting computing device has a status of inactive, indicating that the incomplete transaction is not to be completed and sending a set of undo requests to the set of storage units; and
when the majority of the pending transaction information indicates that the requesting computing device has the status of active:

indicating that the incomplete transaction is to be completed; and instructing the set of storage units to continue with the processing of establishing the winning set.

10. The method of claim 1 further comprises:

after completion of the incomplete transaction, sending a set of clean up requests to the set of storage units.

11. A computer readable memory comprises:

a first memory element that stores operational instructions that, when executed by a computing device, causes the computing device to:

obtain a set of pending transaction information from a set of storage units of a dispersed storage network (DSN) regarding a plurality of pending transactions, wherein a pending transaction of the plurality of pending transactions is regarding a data access request to a set of encoded data slices and wherein the pending transaction information from a storage unit of the set of storage units is regarding one or more pending data access requests for an encoded data slice of the set of encoded data slices, wherein a data segment of a data object is dispersed storage error encoded to produce the set of encoded data slices, and wherein the set of encoded data slices are stored in the set of storage units;

a second memory element that stores operational instructions that, when executed by the computing device, causes the computing device to:

identify an incomplete transaction based on the set of pending transaction information, wherein the incomplete transaction is a stalled pending transaction of the plurality of pending transactions; and determine whether to complete the incomplete transaction based on information regarding a requesting computing device associated with the incomplete transaction;

a third memory element that stores operational instructions that, when executed by the computing device, causes the computing device to:

when the incomplete transaction is not to be completed, instruct the storage units to discard a corresponding data access request associated with the incomplete transaction; and when the incomplete transaction is to be completed:

determine what aspects of the corresponding data access request have not been completed; and instruct at least one of the storage units to complete the aspects of the corresponding data access request.

12. The computer readable memory of claim 11, wherein the pending transaction information comprises one or more of:

one or more proposal records, wherein a proposal record of the one or more proposal records includes, for an encoded data slice or a batch of encoded data slices:

an ordered list of pending transactions regarding the encoded data slice or the batch of encoded data slices;

an indication of current revision level for the encoded data slice or the batch of encoded data slices; and an ordered list of different version of the encoded data slice or the batch of encoded data slices;

a status table that includes information regarding status of data access requesting computing devices having one or more pending transactions; and a blacklist that includes identity of inactive computing devices, wherein an inactive computing device of the inactive computing devices is affiliated with a transaction that cannot be completed due to a persistent inactive status of the inactive computing device.

13. The computer readable memory of claim 11 further comprises:

the second memory element further storing operational instructions that, when executed by the computing device, causes the computing device to:

identify the incomplete transaction as a write operation regarding the set of encoded data slices from the requesting computing device, wherein a write threshold number of encoded data slices of the set of encoded data slices have been successfully stored in at least some of the storage units of the set of storage unit, wherein a particular encoded data slice of the set of encoded data slices was not successfully finalized by a particular storage unit of the set of storage units, and wherein the unsuccessful finalizing of the particular encoded data slice corresponds to the aspects of the corresponding data access request that have not been completed; and determine whether the particular storage unit was sent a finalize request regarding the particular encoded data slice by the requesting computing device;

the third memory element further storing operational instructions that, when executed by the computing device, causes the computing device to:

when the particular storage unit was not sent the finalize request, resending the finalize request to the particular storage unit to complete the write operation; and when the particular storage unit was sent the finalize request:

determining whether the particular storage unit is currently available to receive the finalize request;

when the particular storage unit is available to receive the finalize request, resending the finalize request to the particular storage unit to complete the write operation; and when the particular storage unit is not available to receive the finalize request, flagging the particular encoded data slice for rebuilding.

14. The computer readable memory of claim 13, wherein the third memory element further stores operational instructions that, when executed by the computing device, causes the computing device to:

indicate that the incomplete transaction is not be completed by the particular storage unit when the particular encoded data slice is flagged for rebuilding.

15. The computer readable memory of claim 11 further comprises:

the second memory element further storing operational instructions that, when executed by the computing device, causes the computing device to:

identify the incomplete transaction is a write operation regarding the set of encoded data slices from the requesting computing device, wherein the requesting computing device has a threshold number of write requests of a set of write requests regarding the set of encoded data slices in a first priority position in a set of proposal records of the pending transaction information from the set of storage units, wherein the requesting computing device has not issued a set of finalize requests to the set of storage units regarding the set of encoded data slices, and wherein the not issuing the set of finalize requests corresponds to the aspects of the corresponding data access request that have not been completed; and determine status of the requesting computing device based on the pending transaction information; and the third memory element further storing operational instructions that, when executed by the computing device, causes the computing device to:

when a majority of the pending transaction information indicates that the requesting computing device has a status of inactive, indicate that the incomplete transaction is not to be completed.

16. The computer readable memory of claim 15, wherein the third memory element further stores operational instructions that, when executed by the computing device, causes the computing device to:

when a majority of the pending transaction information indicates that the requesting computing device has a status of active, determine whether to issue the set of finalize requests on behalf of the requesting computing device; and when the set of finalize requests are to be sent on behalf of the requesting computing device, send the set of finalize requests to the set of storage units.

17. The computer readable memory of claim 16, wherein the third memory element further stores operational instructions that, when executed by the computing device, causes the computing device to:

when the set of finalize requests are not to be sent on behalf of the requesting computing device, send an indication to the set of storage units to keep the set of write requests pending.

18. The computer readable memory of claim 11 further comprises:

the second memory element further storing operational instructions that, when executed by the computing device, causes the computing device to:

identify the incomplete transaction is a write operation regarding the set of encoded data slices from the requesting computing device, wherein the requesting computing device does not have a threshold number of write requests of a set of write requests regarding the set of encoded data slices in a first priority position in a set of proposal records of the pending transaction information from the set of storage units, wherein the requesting computing device has not issued a set of undo requests to the set of storage units regarding the set of encoded data slices, and wherein the not issuing the set of undo requests and the set of write requests that are pending correspond to the aspects of the corresponding data access request that have not been completed; and determine status of the requesting computing device based on the pending transaction information;

the third memory element further storing operational instructions that, when executed by the computing device, causes the computing device to:

when a majority of the pending transaction information indicates that the requesting computing device has a status of inactive, indicate that the incomplete transaction is not to be completed and sending a set of undo requests to the set of storage units.

19. The computer readable memory of claim 11 further comprises:

the second memory element further storing operational instructions that, when executed by the computing device, causes the computing device to:

identify the incomplete transaction is a write operation regarding the set of encoded data slices from the requesting computing device, wherein the requesting computing device is involved in a process of establishing one set of a plurality of sets of write requests as a winning set of write requests having a threshold number of write requests in a first priority position and wherein the process of establishing the winning set corresponds to the aspects of the corresponding data access request that have not been completed; and determine status of the requesting computing device based on the pending transaction information;

the third memory element further storing operational instructions that, when executed by the computing device, causes the computing device to:

when a majority of the pending transaction information indicates that the requesting computing device has a status of inactive, indicate that the incomplete transaction is not to be completed and sending a set of undo requests to the set of storage units; and when the majority of the pending transaction information indicates that the requesting computing device has the status of active:

indicate that the incomplete transaction is to be completed; and instruct the set of storage units to continue with the processing of establishing the winning set.

20. The computer readable memory of claim 11, wherein the third memory element further stores operational instructions that, when executed by the computing device, causes the computing device to:

after completion of the incomplete transaction, send a set of clean up requests to the set of storage units.

* * * * *